(12) United States Patent
Mullally

(10) Patent No.: US 12,061,012 B2
(45) Date of Patent: Aug. 13, 2024

(54) SEALING COVER FOR EVAPORATIVE COOLER BLOWER

(71) Applicant: Larry Mullally, Espanola, NM (US)

(72) Inventor: Larry Mullally, Espanola, NM (US)

( * ) Notice: Subject to any disclaimer, the term of this patent is extended or adjusted under 35 U.S.C. 154(b) by 0 days.

(21) Appl. No.: 17/227,903

(22) Filed: Apr. 12, 2021

(65) Prior Publication Data

US 2021/0318001 A1 Oct. 14, 2021

Related U.S. Application Data

(60) Provisional application No. 63/009,021, filed on Apr. 13, 2020.

(51) Int. Cl.
*F24F 5/00* (2006.01)
(52) U.S. Cl.
CPC .................. *F24F 5/0035* (2013.01)
(58) Field of Classification Search
CPC ........ F24F 5/0035; F24F 1/58; F24F 2221/52; F04D 29/703; F04D 29/701; F04D 29/70

USPC ........ 150/165; 454/264, 265, 275, 347, 358, 454/367, 368; 415/121.2
See application file for complete search history.

(56) References Cited

U.S. PATENT DOCUMENTS

| 3,273,867 | A | * | 9/1966 | Enblom | ................ F24F 5/0035 261/118 |
| 6,045,329 | A | * | 4/2000 | Sobala | .................. F04D 29/703 416/247 R |
| 9,091,455 | B1 | * | 7/2015 | Coster | ..................... F24F 13/20 |

FOREIGN PATENT DOCUMENTS

JP 2008298396 A * 12/2008

\* cited by examiner

*Primary Examiner* — Tavia Sullens
(74) *Attorney, Agent, or Firm* — Schmeiser, Olsen & Watts LLP; Timothy P. Collins

(57) ABSTRACT

A protective covering for an evaporative cooler blower housing, comprising an inner region formed of a non-permeable material; a perimeter about the inner region; and an attachment mechanism about one side of the perimeter for coupling to a surface of a housing of the evaporative cooler.

7 Claims, 13 Drawing Sheets

SEALING COVER FOR EVAPORATIVE COOLER BLOWER

RELATED APPLICATIONS

This application claims priority to U.S. Provisional Application No. 63/009,021 filed Apr. 13, 2020 and entitled "Cover for Evaporative Cooler Blower," the entirety of which is incorporated by reference herein.

FIELD OF THE INVENTION

The inventive concepts relate generally to an evaporative cooling apparatus. More specifically, the inventive concepts relate to squirrel cage cover for an evaporative cooler.

BACKGROUND

Evaporative coolers, often referred to as "swamp coolers," are constructed and arranged to use evaporating water in combination with blowing air to cool an interior of a home, office, or other building structure.

Evaporative coolers typically include a blower mounted within a squirrel cage type housing. Because of the cage-like configuration of the rotor, it is commonly referred to as a squirrel cage. As shown in FIGS. 1A and 1B, the squirrel cage housing is prone to receiving dust, loose impediments, and other undesirable matter which can expose the blower to such matter, and which can damage the blower. For example, dust pollen can enter the ductwork of the blower and extend beyond the ducts. During the winter months when the cooler is typically inactive, mice, insects, squirrels, or the like may nest in the housing, ductwork, or other components of the blower. Similarly, the open ducts can expose a cooler to dust, debris, or other undesirable objects, impediments, or other matter. This can result in damage to the cooler in the spring when the cooler is used so when turned on the dust, mice, or the like in the ducts is distributed to the interior of the housing.

SUMMARY

Provided in some embodiments is a protective covering for an evaporative cooler blower, comprising a body formed of a material constructed and arranged for positioning about an opening of a housing of the evaporative cooler blower and further covering both components of the blower protruding through the opening and components coupled to a wall of the housing; and attachment mechanism about one side of a perimeter of the body for coupling to a surface of a housing of the evaporative cooler, and conforming to at least the components coupled to the wall.

DETAILED DESCRIPTION OF THE EMBODIMENTS

In the following description, specific details are set forth although it should be appreciated by one of ordinary skill that the systems and methods can be practiced without at least some of the details. In some instances, known features or processes are not described in detail so as not to obscure the present invention.

In brief overview, embodiments of the present inventive concepts include a physical cover constructed and arranged for positioning over openings at one or more sides, e.g., opposite sides, of a squirrel cage housing of an evaporative cooler.

Figure 1A:
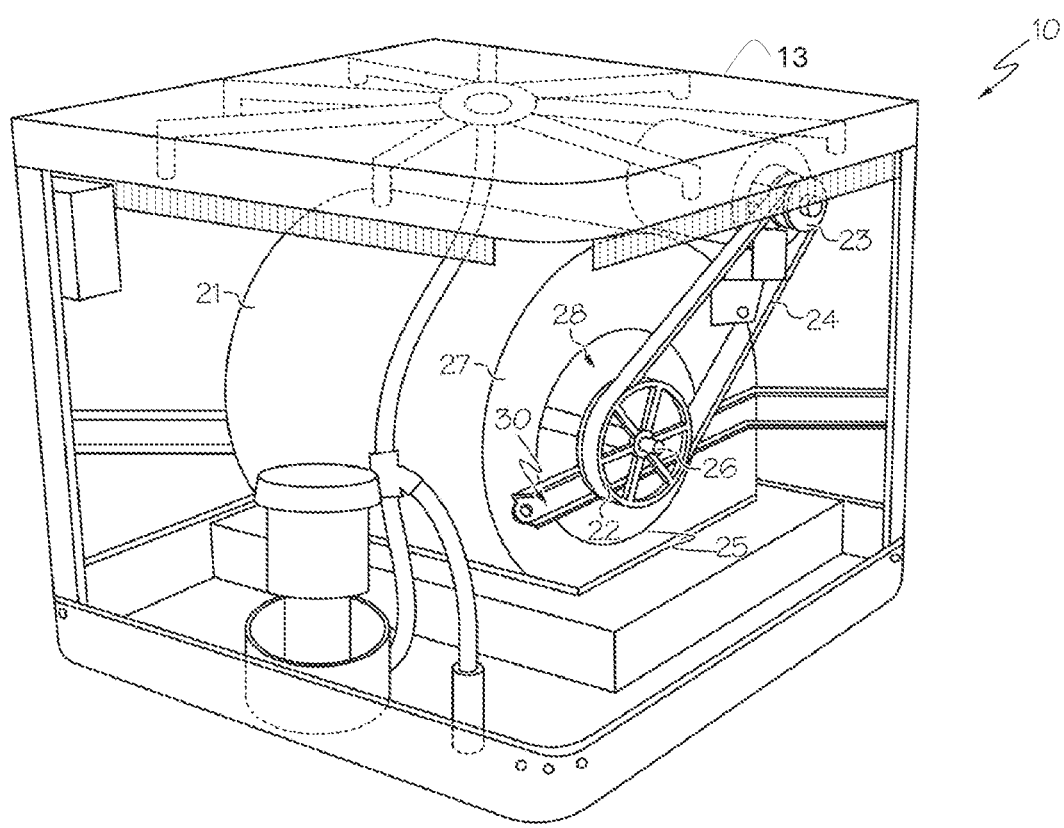
FIGS. 1A and 1B are perspective views of an evaporative cooler.
Figure 1B:
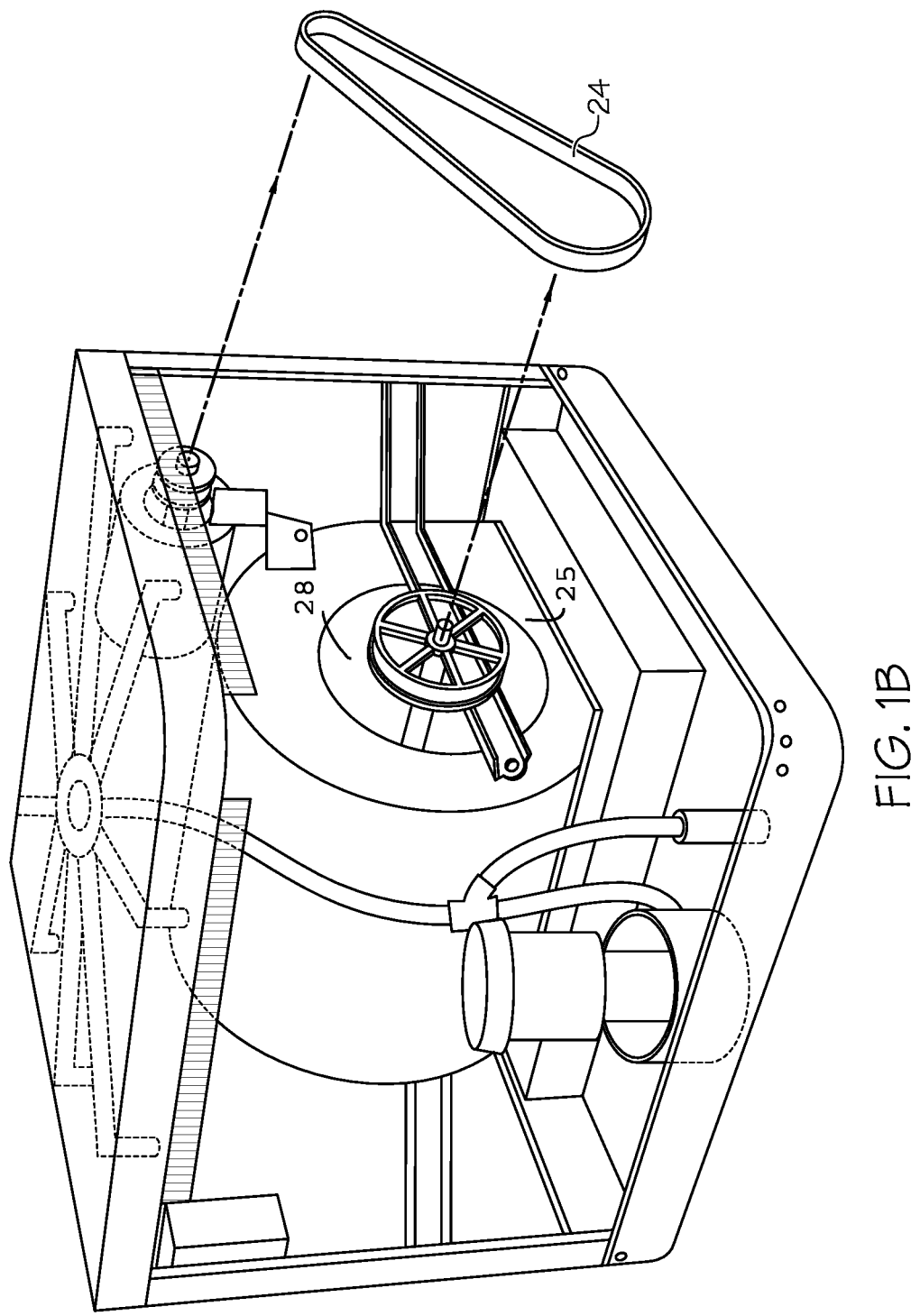
Figure 1C:
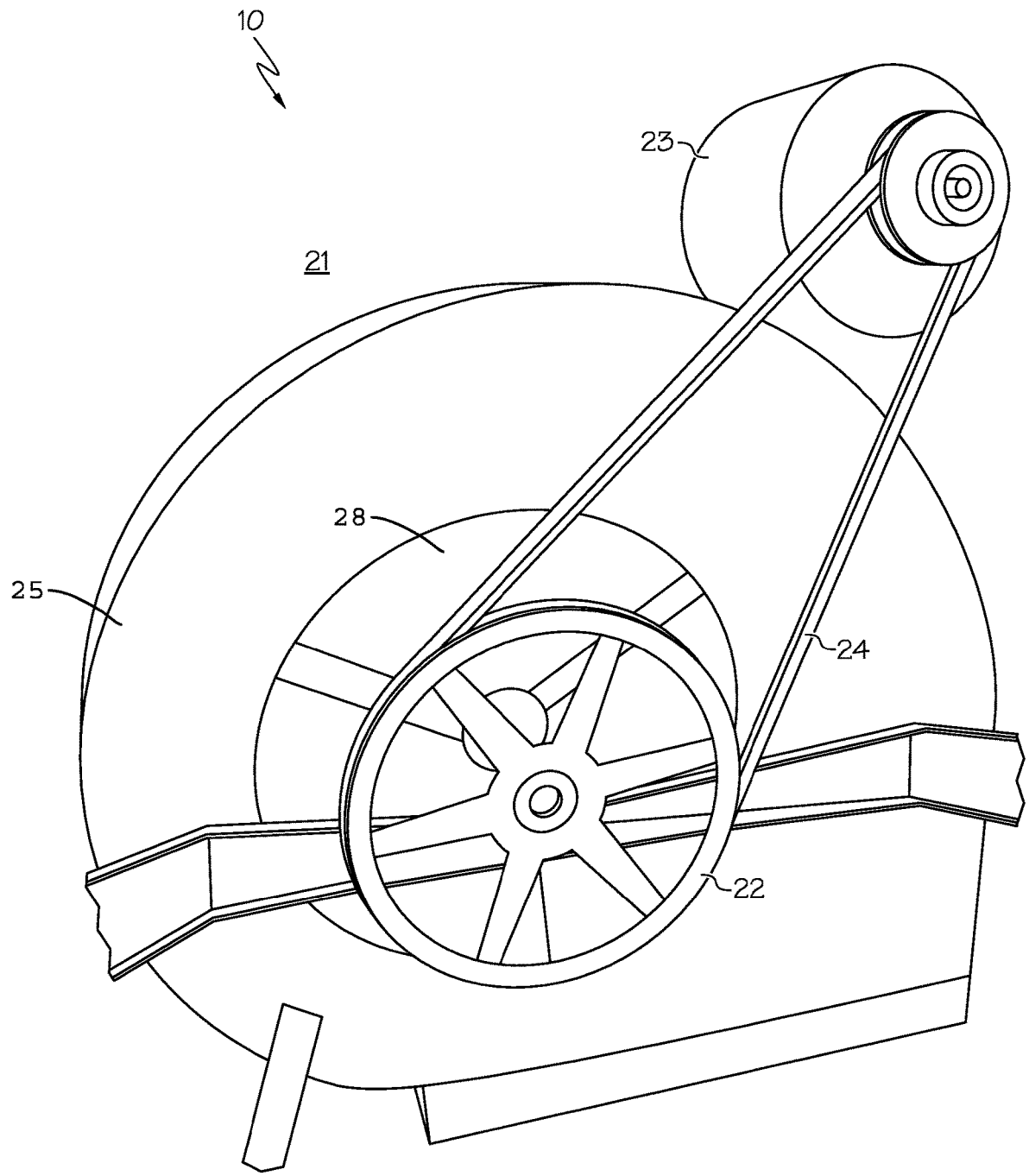
FIGS. 1C and 1D are close-up views of the evaporator cooler of FIGS. 1A and 1B.
Figure 1D:
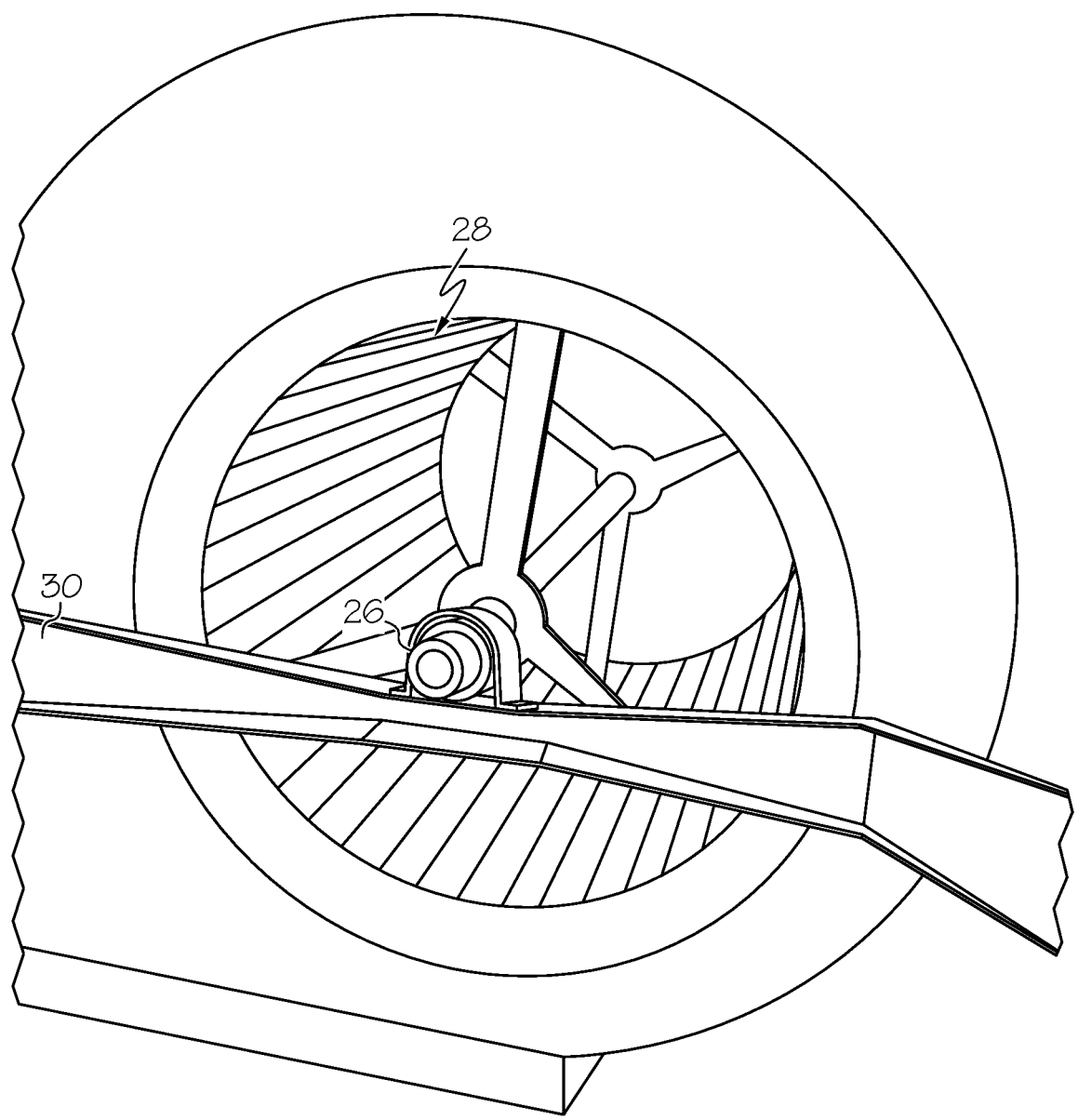

FIG. 1A is a perspective view of an evaporative cooler 10. The evaporative cooler 10 includes a blower 21 having a blower shaft 26 and a pulley 22 that is driven by a motor pulley 23 by way of a belt 24 positioned about the blower pulley 22 and motor pulley 23. The blower shaft 26 extends from a housing 25, or squirrel cage or the like. The interior of the housing 25 includes a fan, bearings, ducts, and other mechanical components (not shown) that generate air flow through the cooler 10 when the squirrel cage fan rotates inside the housing 25, for example, shown in FIGS. 1C and 1D. The blower pulley 22 and at least a portion of the shaft 26 protrude from an opening 28 and extend beyond a wall 27 of the blower 21 forming the opening 28. Other components, such as a motor support bracket 30 may be coupled to an exterior of the blower 21.

The interior of the housing 25 including the fan, etc. can be exposed at either side or both sides of the housing 25. In doing so, the opening 28 of the housing 25 exposes the interior to external and undesirable elements such as dirt, dust, debris, pollen and so on, which can enter the air ducts or damage or otherwise reduce the life expectancy of the fan blades and/or other mechanical components inside the housing 25. Embodiments of the present inventive concepts include an apparatus that covers the opening(s) of the cooler 10, for example, in the fall season after the cooler 10 is drained of water or otherwise "winterized."

Figure 2A:
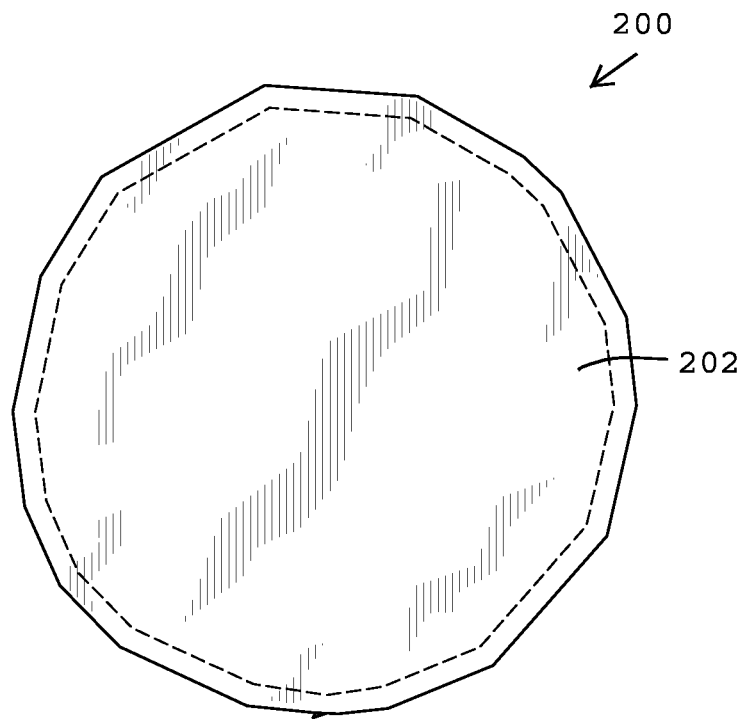
FIGS. 2A and 2B are front and rear views of a blower cover for covering a blower housing of an evaporative cooler, in accordance with some embodiments.
Figure 2B:
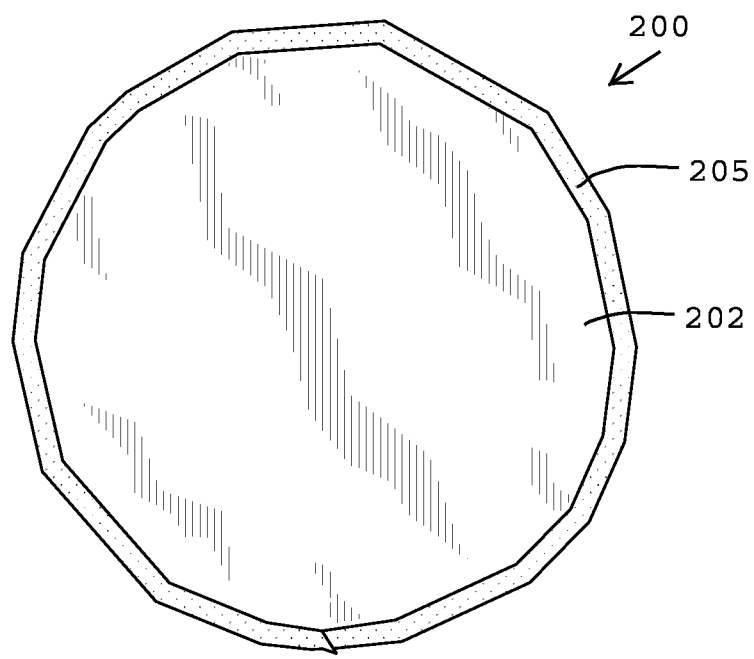

FIGS. 2A and 2B are top and bottom views of a blower cover 200 for covering a blower housing of an evaporative cooler, in accordance with some embodiments. The cover 200 may have a 20 inch diameter, but is not limited thereto, so long as the diameter is sufficient to completely cover the housing opening. The cover 200 may have a thickness of 0.5 mil, but it not limited thereto. In some embodiments, two covers 200 are required: one for covering the opening on each side of the blower 21.

The blower cover 200 includes a main body 202 and an attachment mechanism 204 about a periphery, or rim, of the main body 202. In some embodiments, the main body 202 is formed of plastic, canvas, or related reusable material. In preferred embodiments the main body 202 is waterproof or otherwise non-permeable. In other embodiments, the main body 202 is porous, permeable, or the like to permit air flow or permitting the blower to "breath" with the cover 200 through the housing interior but sufficient to prevent dust or other small particles from entering the housing interior. In some embodiments, the main body 202 includes micropores, fibers arranged to form webbing, and so on. Regardless of the material, the body 202 is constructed and arranged to prevent pollen, dust, or other fine particles from entering the housing 25 and the air ducts beyond the evaporative cooler 10 via the blower 21.

In some embodiments, the main body 202 is shaped for direct attachment to a surface of the cooler blower housing 25 positioned in a cooler housing 13 of the evaporator cooler 10. The main body 202 may be constructed and arranged for a particular porosity for prohibiting larger contaminants from passing through the main body 202 while allowing smaller particles in some embodiments such as gasses including air or the like, vapor, and so on to be exchanged between the blower and an ambient environment. The main body 202 has a first side facing the interior of the housing and a second side facing an ambient environment. Some or all sides of the cooler housing 13 may have a removable door with a pad at the top to bottom where water flows through to produce cold air. This may be another source of trapping of dust or other undesirable matter.

In some embodiments, the main body 202 is positioned about mechanical components of the cooler extending from the housing opening 28 such as a blower shaft 26, support brackets 30, and/or blower pulley 22. As described above, the blower shaft 26 extends beyond the wall 27 of the blower 21. The blower pulley 22 is rotated by the shaft 26, both of which extends from the housing opening 28. The main body 202 extends along the entire opening 28 of the blower 21, Since the pulley 22 and shaft 26 are positioned in front the opening 28, these blower components are likewise covered.

Figure 3A:
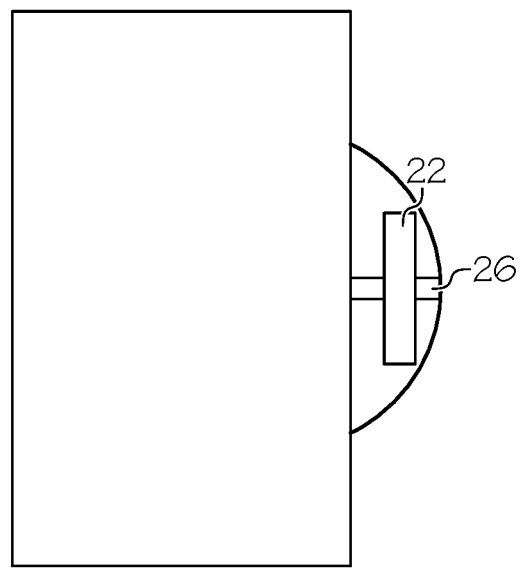
FIGS. 3A and 3B are side and top views, respectively, of a blower cover attached to and covering a blower housing of an evaporative cooler, in accordance with some embodiments.
Figure 3B:
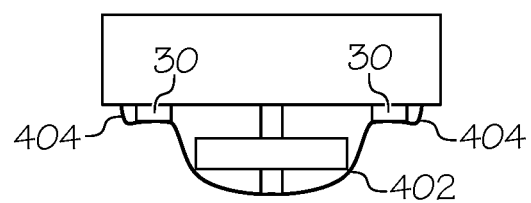
Figure 4:
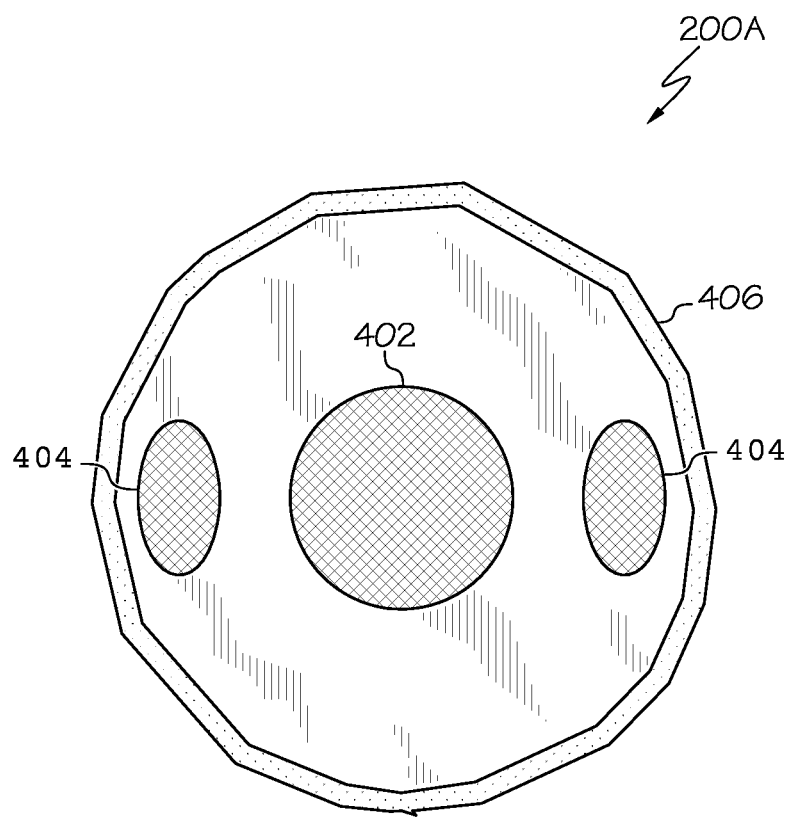
FIG. 4 is a front view of a blower cover, in accordance with other embodiments.
Figure 5A:
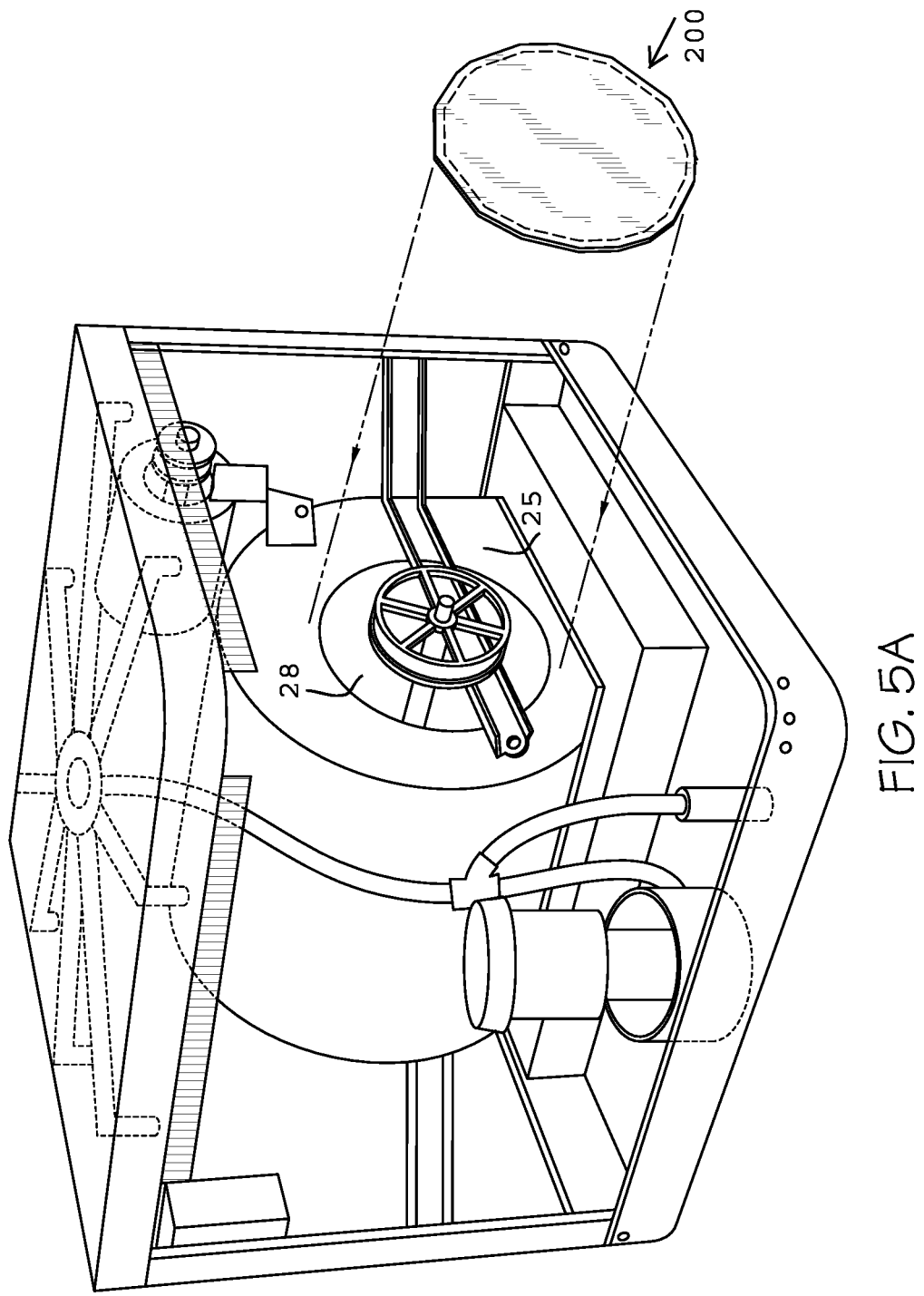
FIGS. 5A-5D are views of a blower cover being positioned about a blower housing of an evaporative cooler, in accordance with some embodiments.
Figure 5B:
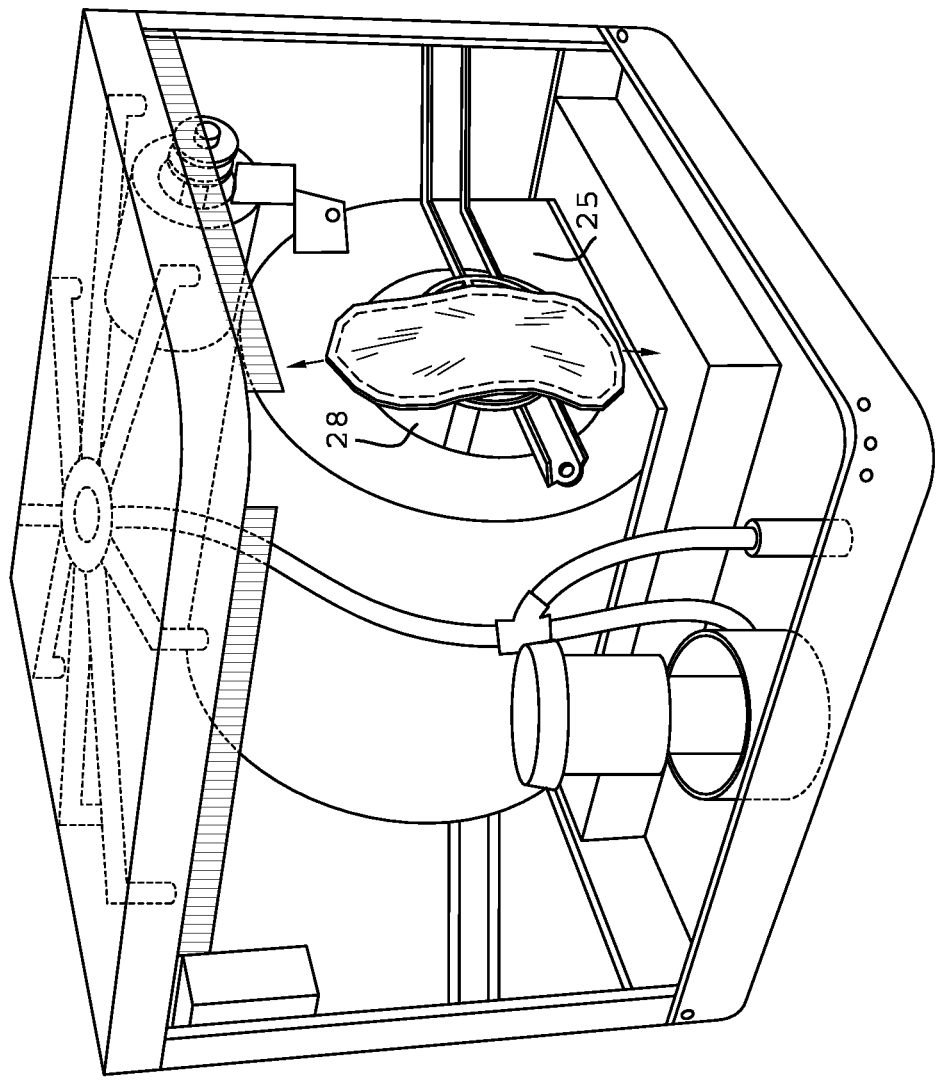

An attachment mechanism 204 engages the blower 21 to seal off the inside of the blower 21 from dust and other contaminants. In some embodiments, as shown in FIG. 1A, the blower 21 is housed in a cooler housing 13. In some embodiments, the attachment mechanism is constructed and arranged as an annular ring attached to or formed as part of the perimeter of the body 202, for example, forming a rim that provides structure and stability to the body 202. The attachment mechanism 204 is constructed and arranged to attach to the wall 27 of the blower housing 25 of the blower 21 to provide a seal between the cover 200 and the wall 27 so that the body 202 can cover the entire opening 28 to the interior of the blower 21, notwithstanding the presence of protruding components of the blower 21 such as the shaft 26, etc., which are likewise covered by the body 202. The attachment mechanism 204 at the first side of the main body 202 is constructed and arranged to directly attach to the blower housing 25 and to form a seal about the housing opening. The periphery of the main body 202 may have the attachment mechanism 204 integrated therein. Here, the periphery of the main body 202 may have a feature such as flexibility, thickness, non-permeability, etc. that is different than an interior of the main body 202. For example, the interior 202 may be "pre-stretched" to a desired amount of elasticity when in a planar construction, but sufficiently flexible for positioning over a pulley or other object at the housing opening. Other embodiments include an inelastic body 202, where instead of the material allowing the body 202 to stretch over protruding blower components such as the shaft 26, etc., the body 202 is non-planar even when not attached to the wall 27. Here, the body 26 has regions formed of different shapes, depths, thicknesses, or other dimensions preconfigured for positioning over elements of the blower 21 extending from the interior of the housing 25 and/or along the exterior of the wall 27. For example, as shown in FIG. 5B, a first region 402 of the cover body 200A is positioned about the blower pulley 22 and shaft 26. At least one second region 404 of the cover body 200A is positioned about the bracket 30 extending along the wall 27. As shown in FIG. 4, the first region 402 can be at a central region of the cover body 200A for positioning about a tip of the shaft 26 and the blower pulley 22. In doing, so the first region 402 may have a different thickness, width, circumference, or other dimension than the other regions of the cover body 200A. A surface area of the first region 402 may be greater than a surface area of the planar regions of the body 200A. For example, the first region 402 may be constructed to protrude from a plane of the cover body 200A as shown in FIGS. 3-4, and adapt to protruding components such as the shaft 26 and the blower pulley 22, but not limited thereto.

The second regions 404 may likewise have a different thickness, width, circumference, or other dimension than the other regions of the cover body 200A, except that the second regions 404 may adapt to the bracket 30 or other external mechanical component coupled to the wall 27 of the cooler housing 25. For example, a second region 404 may be surrounded by an element 406 such as a source of adhesive tape, wire, or the like for forming a pucker that permits the second region 404 to wrap around the bracket 30, or mold or comply with the shape of the bracket 30, forming a pucker. Such an element 406, e.g., tape, or material similar to the attachment mechanism 204 may not only cover the portion of the bracket 30 over or near the opening of the housing 25, but may also provide a seal the bracket 30 by attaching to the wall 27 of the housing 25. The second regions 404 are at or near the periphery of the body 200A. The second regions 404 may include two regions, each at opposite sides of the body 200A. A surface area of the second regions 404 may be greater than a surface area of the planar regions of the body 200A.

Figure 2C:
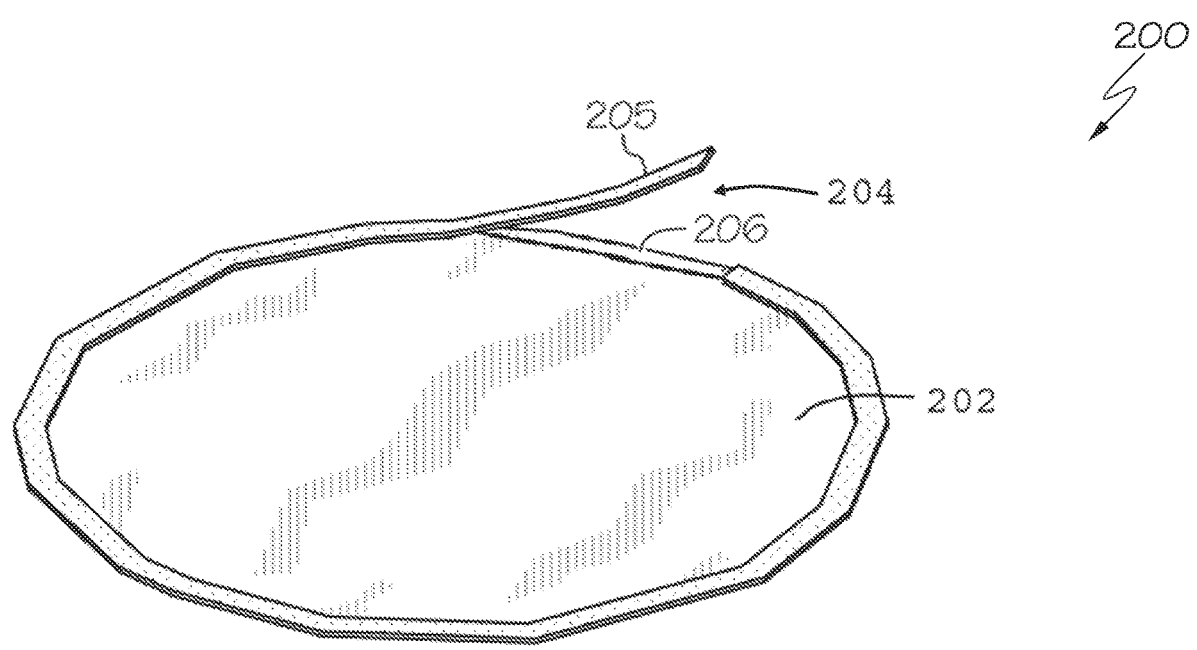
FIG. 2C is a rear view of the blower cover of FIG. 2B, with a portion of an adhesive backing of an attachment mechanism separated to expose an adhesive, in accordance with some embodiments.

The periphery of the cover 200 formed by the attachment mechanism 204 on the other band may be rigid as compared to the interior, i.e., body 202. In other embodiments, the attachment mechanism 204 is coupled to the periphery of the main body 202. The attachment mechanism 204 can be an adhesive, Velcro™ material, flexible foam such as memory foam, etc., and/or may include mechanical elements such as screws, hooks, zippers, or the like so that a coupling relationship is formed between the attachment mechanism 204 and the wall 27 of the cooler housing 25. As shown in FIG. 2C, the attachment mechanism 204 may include an adhesive backing 206 that is exposed when an adhesive strip 205 is removed. In other embodiments, the wall 27 includes other attachment means such as holes, grooves, Velcro™, or other mating elements for permitting the attachment mechanism 204 at the periphery of the main body 202 to couple to the cooler housing 25.

The cover 200 may be constructed and arranged for positioning over the cooler housing 25 during summer months, where the sealing features of the cover 200 prevent smoke, pollen, dust, insects, and so on from entering the housing 25. The cover 200 may be operate in winter months in addition, or alternatively, after the blower has been "winterized," where water is drained and so on.

Figure 5C:
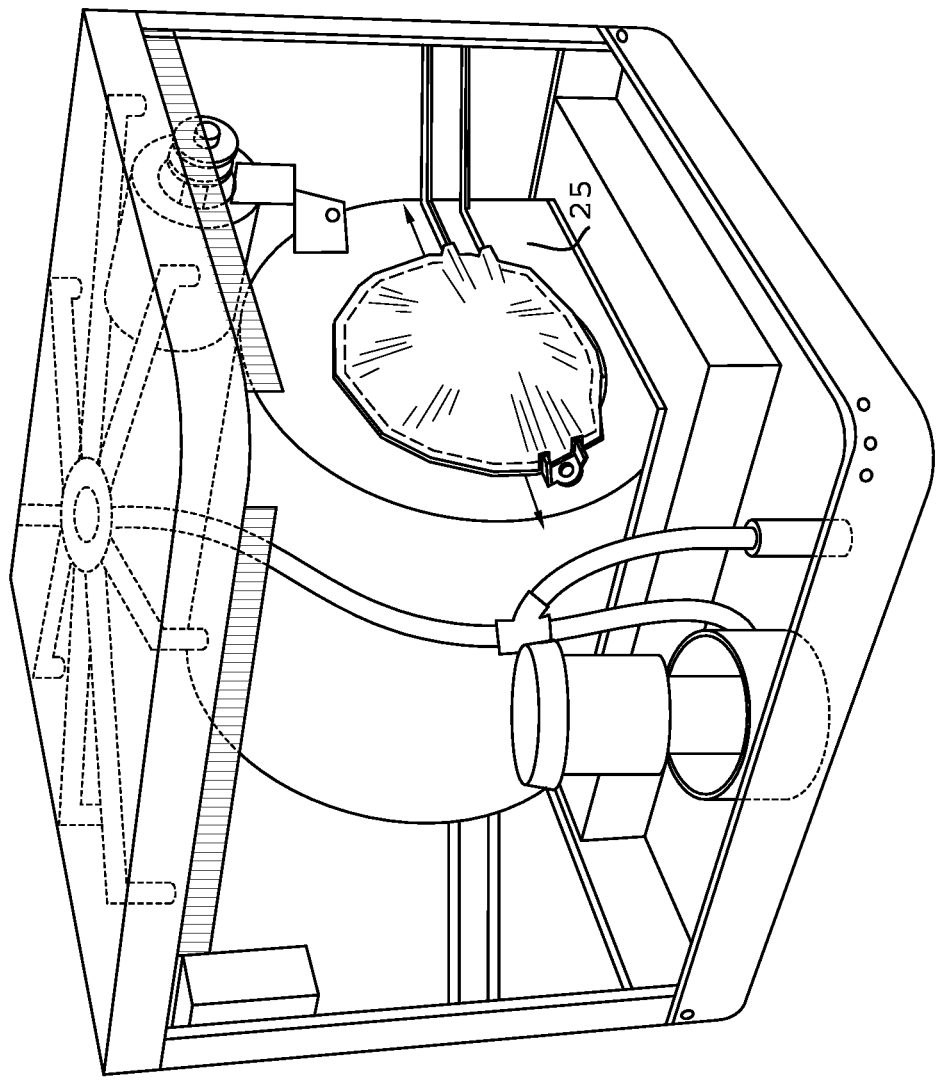
Figure 5D:
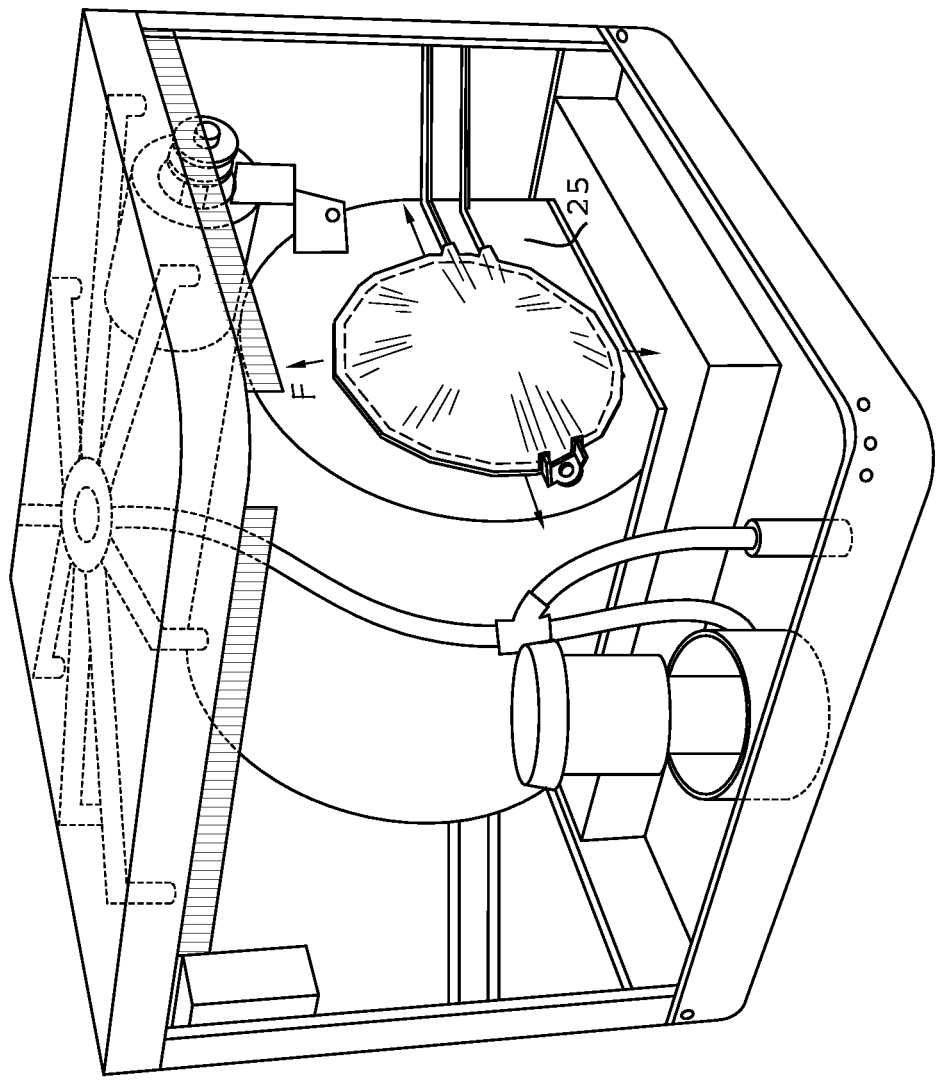
Figure 6:
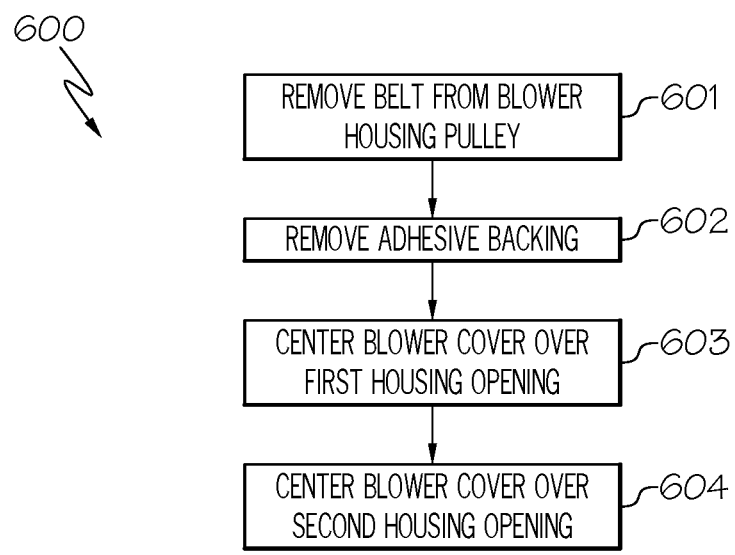
FIG. 6 is a method for protecting a blower interior from external contaminants, in accordance with some embodiments.

FIG. 6 is a method 600 for protecting a blower interior from external contaminants, in accordance with some embodiments. In describing the method 600, reference is made to features of FIGS. 1-5D.

At block 601, the belt 24 is removed from the blower housing pulley 22.

At block 602, the protective paper of the adhesive strip 205 is removed about the perimeter of the cover 200, for example, shown in FIG. 2C.

At block 603, with the adhesive backing 206 of the cover 200 facing the blower housing 25, the cover 200 is centered over one side of the housing opening (first opening), and one or more forces is applied so that the adhesive engages with the blower surface. The force may be applied in a particular manner, for example, starting at the top of the cover 200, and applying a force that radiates from the top to the sides then the bottom of the cover 200, for example, shown by arrows (F) in FIGS. 5A-5D.

At block 604, a second cover 200 similar to the first cover in blocks 602-603 is positioned over the opposite side of the housing opening. Similarly, the adhesive strip is removed, etc., for example, shown in FIG. 2C.

For each cover 200, a pucker or the like may be formed when attaching the cover, where portions of the bottom of the cover are positioned over protruding parts such as the bars or brackets supporting the cage (see drawings), then squeezed together to form a seal, pucker, or the like about the bars or the like, as shown in FIGS. 5C and 5D.

Although method 600 describes the coupling of the cover 200 to the blower housing 25 when the blower is not in operation, other embodiments include the cover 200 about the blower housing 25 during operation. Here, the belt 24 is coupled to the pulley 22 and coexists with the presence of the cover 200 coupled to the blower housing 25. To achieve this, the cover 200 may include a hole so that the pulley shaft extends from the housing 25 through the hole in the cover 200 to the pulley so that the pulley can rotate freely notwithstanding the presence of the cover 200 coupled to the housing.

While the invention has been shown and described with reference to specific embodiments, it should be understood by those skilled in the art that various changes in form and detail may be made therein without departing from the spirit and scope of the invention.

What is claimed is:

1. A protective covering for an evaporative cooler blower having a housing, comprising:
   a porous body allowing air to pass through the body but preventing pollen, dust, or other fine solid particles from passing through the body, the body formed of a single material constructed and arranged for positioning about and completely covering an opening of the housing of the evaporative cooler blower and further covering both at least one component of the evaporative cooler blower protruding through the opening and at least one component including a motor support bracket coupled to a wall of the housing of the evaporative cooler blower; and
   an attachment mechanism encompassing an entire one side of a perimeter of the body for coupling to the wall of the housing of the evaporative cooler blower, and conforming to the at least one component coupled to the wall of the housing of the evaporative cooler blower, the single material at the perimeter of the body having a different thickness than the single material at a central region of the body, the central region covering the at least one component of the blower protruding through the opening, and both the central region and the perimeter of the body surrounding the at least one component coupled to the wall of the housing of the evaporative cooler blower, wherein:
   the body has a first side facing an interior of the housing of the evaporative cooler blower and a second side facing an ambient environment;
   the central region includes the single material so that a portion of the at least one component of the blower protruding through the opening of the housing directly contacts the first side of the body and does not extend to the second side facing the ambient environment; and
   at least a portion of the perimeter encompassed by the attachment mechanism forms a pucker that permits the at least the portion of the perimeter to wrap around the motor support bracket and provides a seal by attaching to the wall of the housing.

2. The protective covering of claim 1, wherein the attachment mechanism includes an adhesive backing that is exposed to the wall of the housing of the evaporative cooler blower when an adhesive strip is removed from the adhesive backing for direct attachment to the wall of the housing.

3. The protective covering of claim 1, wherein the body further comprises first and second peripheral regions between the central region of the body and the perimeter, wherein the first and second peripheral regions are constructed and arranged for positioning about the at least one component coupled to the wall of the housing.

4. The protective covering of claim 1, wherein the protective covering includes a first portion positioned over one side of the opening and a second portion positioned over another side of the opening.

5. The protective covering of claim 1, wherein the attachment mechanism is constructed and arranged as an annular ring about the perimeter of the body.

6. The protective covering of claim 1, wherein the body is formed of plastic or canvas.

7. The protective covering of claim 1, wherein the at least one component of the evaporative cooler blower protruding through the opening includes a shaft, and wherein the single material of the central region of the body covering the shaft is inelastic.

* * * * *